United States Patent [19]

Taleyarkhan

[11] Patent Number: 4,698,204
[45] Date of Patent: Oct. 6, 1987

[54] INTERMEDIATE FLOW MIXING NONSUPPORT GRID FOR BWR FUEL ASSEMBLY

[75] Inventor: Rusi P. Taleyarkhan, Pittsburgh, Pa.

[73] Assignee: Westinghouse Electric Corp., Pittsburgh, Pa.

[21] Appl. No.: 908,139

[22] Filed: Sep. 17, 1986

[51] Int. Cl.⁴ .............................................. G21C 3/34
[52] U.S. Cl. ..................... 376/439; 376/438; 376/443
[58] Field of Search ........................ 376/439, 443, 438

[56] References Cited

U.S. PATENT DOCUMENTS

| | | | |
|---|---|---|---|
| 3,933,584 | 1/1976 | Litt | 376/439 |
| 4,039,379 | 8/1977 | Patterson | 376/439 |
| 4,061,536 | 12/1977 | Creagan | 376/439 |
| 4,125,434 | 11/1978 | Fromel | 376/439 |
| 4,578,239 | 3/1986 | Steinke | 376/439 |
| 4,585,616 | 4/1986 | DeMario | 376/439 |
| 4,649,021 | 3/1987 | Taleyarkhan | 376/444 |

*Primary Examiner*—Donald P. Walsh

[57] ABSTRACT

A BWR fuel assembly having an array of spaced fuel rods, an outer tubular flow channel surrounding the fuel rods to direct flow of coolant fluid therealong, and a central water cross extending through the channel and dividing the fuel rods into separate subassemblies which each has fuel rod support spacers being displaced from one another along the length of the subassembly, includes features in each subassembly which minimize degradation of CHF performance. These features relate to intermediate flow mixing nonsupport grids disposed along each subassembly between and in spaced relation from the uppermost pairs of the spacers. The grid includes first and second groups of mixing vanes disposed at its downstream side. The vanes of the first group are attached on portions of the outer strap and on respective portions of the inner straps which together with the outer strap portions define the perimeter cell openings. The vanes of the second group are attached on other portions of the inner straps which together with the respective portions thereof define the inner cell openings. Each mixing vane of both groups extends downstream and inwardly toward the respective cell openings for deflecting coolant flowing therethrough. The mixing vanes of the second group are substantially smaller in size than those of the first group so as to generate substantially less turbulence in coolant flow through the inner cell openings than through the perimeter cell openings.

16 Claims, 9 Drawing Figures

INTERMEDIATE FLOW MIXING NONSUPPORT GRID FOR BWR FUEL ASSEMBLY

CROSS REFERENCE TO RELATED APPLICATIONS

Reference is hereby made to the following copending U.S. patent applications dealing with related subject matter and assigned to the assignee of the present invention:

1. "Nuclear Fuel Spacer Grid With Improved Outer Straps" by E. E. DeMario, assigned U.S. Ser. No. 473,515 and filed 3/9/83 (W.E. 51,064).
2. "A Coolant Flow Mixer Grid For A Nuclear Reactor Fuel Assembly" by E. E. DeMario et al, assigned U.S. Ser. No. 567,450 and filed Dec. 30, 1983 (W.E. 50,974).

BACKGROUND OF THE INVENTION

1. Field of the Invention

The present invention relates generally to fuel assemblies for a nuclear reactor and, more particularly, is concerned with a boiling water reactor (BWR) fuel assembly having an intermediate flow mixing nonsupport grid at one or more strategic axial locations being tailored for optimizing the relative critical heat flux (CHF) performance of the fuel rod bundle.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In a typical boiling water reactor (BWR) fuel assembly, a bundle of fuel rods are subdivided into four separate mini-bundles by a central water cross and each mini-bundle is supported in laterally spaced-apart relation by a plurality of axially displaced grids or spacers, for example six in number, axially spaced apart along its fuel rods. The spacers are needed to maintain the desired fuel mini-bundle configuration. Then, all four mini-bundles of the fuel assembly are encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces such BWR fuel assembly is illustrated and described in U.S. Pat. No. 4,560,532 to Barry et al.

The critical heat flux (CHF) performance of a BWR fuel assembly is of paramount importance in the safe operation of a BWR. Upon occurrence of a CHF condition, the surface heat transfer coefficient drops by a large amount, leading to an exponential rise in fuel rod cladding temperature. This can cause rupture and release of fission fragments into the coolant. In order to avoid this condition, regulatory guidelines restrict BWR operation to a low enough level to avoid the CHF condition.

With respect to a BWR fuel assembly like that of the aforementioned patent, it has been realized that CHF performance is highest for fuel rods in the corner and side, or perimeter, spacer locations and lowest for fuel rods in the interior locations. This is due primarily to the hotter steam of the two-phase coolant tending to drift towards the interior fuel rod locations while the cooler liquid of the two-phase coolant accumulates at the channel along the perimeter fuel rod locations. As a result, premature dryout and degradation of CHF performance occurs at the interior fuel rod locations.

Consequently, a need exists to improve CHF performance at the interior fuel rod locations so as to enhance the overall CHF performance of the fuel assembly. While turbulence generating mixing vanes have been employed heretofore on PWR fuel assembly spacers to achieve mixing and homogenization of flowing coolant, for example as disclosed in the above cross-referenced applications and in U.S. Pat. Nos. 3,379,619 (to Andrews et al) and 3,395,077 (to Tong et al) being assigned to the assignee of the present invention, none of the designs disclosed are viewed as particularly adapted to provide the improvement being sought herein.

SUMMARY OF THE INVENTION

The present invention provides an intermediate flow mixing grid designed to satisfy the aforementioned needs. Underlying the present invention is the realization that a more even distribution of liquid coolant within the mini-bundles, especially at axial CHF limiting locations, would lead to the interior rods exhibiting enhanced CHF performance similar to the rods at corner and side, or perimeter, spacer locations. Specifically, improved CHF performance would result from an increase in upstream turbulence in the two-phase coolant flow, especially at the CHF limiting locations. An intermediate flow mixing grid is desirable which would provide turbulent mixing and homogenization at only a slight increase in pressure drop which could be readily compensated for by enlarging the flow areas in the lower tie plates. Mixing vanes are introduced only on the downstream side of the grid, and the position, size and angle of the downstream vanes are such as to provide for the most efficient flow mixing without disturbing the high void fraction central regions of the coolant flow. Liquid coolant from the cold channel walls is homogenized over the fuel rod bundle cross-section. These vanes are provided on the downstream side of the grid because in BWRs, CHF only occurs upstream of the fuel rod spacers. By making the upstream side of the intermediate flow mixing grid streamlined, CHF occurrences are avoided at these places.

Accordingly, the present invention is directed to an intermediate flow mixing nonsupport grid for use in a nuclear reactor fuel assembly containing an array of elongated fuel rods. The flow mixing grid includes: (a) a plurality of interleaved inner straps arranged in an egg-crate configuration to define a plurality of inner cell openings for receiving therethrough respective ones of the fuel rods, the inner straps having outer terminal end portions; (b) an outer peripheral strap attached to the respective terminal end portions of the inner straps to define a plurality of perimeter cell openings for receiving therethrough other ones of the fuel rods, the inner straps and outer strap together having opposite upstream and downstream sides; (c) a first group of mixing vanes disposed at the downstream side and being attached on portions of the outer strap and on respective portions of the inner straps which together with the outer strap portions define the perimeter cell openings, each of the mixing vanes of the first group extending generally in a downstream direction and inwardly toward the perimeter cell openings for deflecting coolant flowing therethrough; and (d) a second group of mixing vanes disposed at the downstream side and being attached on other portions of the inner straps which together with the respective portions thereof define the inner cell openings, each of the mixing vanes of the second group extending generally in a downstream direction and inwardly toward the inner cell openings for deflecting coolant flowing therethrough; (e) the mixing vanes of the second group being substantially smaller in size than the mixing vanes of the first group so as to generate substantially less turbulence in the portions of the coolant flowing through the inner cell openings than in the portions of the coolant flowing through the perimeter cell openings.

More particularly, the mixing vanes of the first group are substantially identical with one another, whereas the mixing vanes of the second group are substantially identical with one another. Furthermore, the mixing vanes of the second group are substantially shorter in height than the mixing vanes of the first group. On the other hand, the mixing vanes of the second group are substantially identical in length to the mixing vanes of the first group. However, in both the first and second groups, each mixing vane is substantially greater in length than in height.

Still further, each of the mixing vanes of the first and second groups has a strip-like form and bottom and top edges interconnected by opposite lateral side edges. The bottom edge of the vane at which it is attached to a respective one of the outer and inner strap portions is of a length substantially the same as that of the respective one strap portion. The side edges convergently taper upwardly and inwardly toward the respective one of the perimeter and inner cell openings and the top edge is of a length shorter than that of the bottom edge and has a concave shape. The respective lengths of the side edges are substantially shorter than the lengths of either the bottom or top edges.

Additionally, the distance between opposing vanes associated with each of the perimeter and inner cell openings is greater than the diameter of the fuel rod receivable through the cell opening.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIGS. 1 to 7, there is shown a nuclear fuel assembly, generally designated 10, for a BWR to which the improved features of the present invention can be advantageously applied. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

Figure 1:
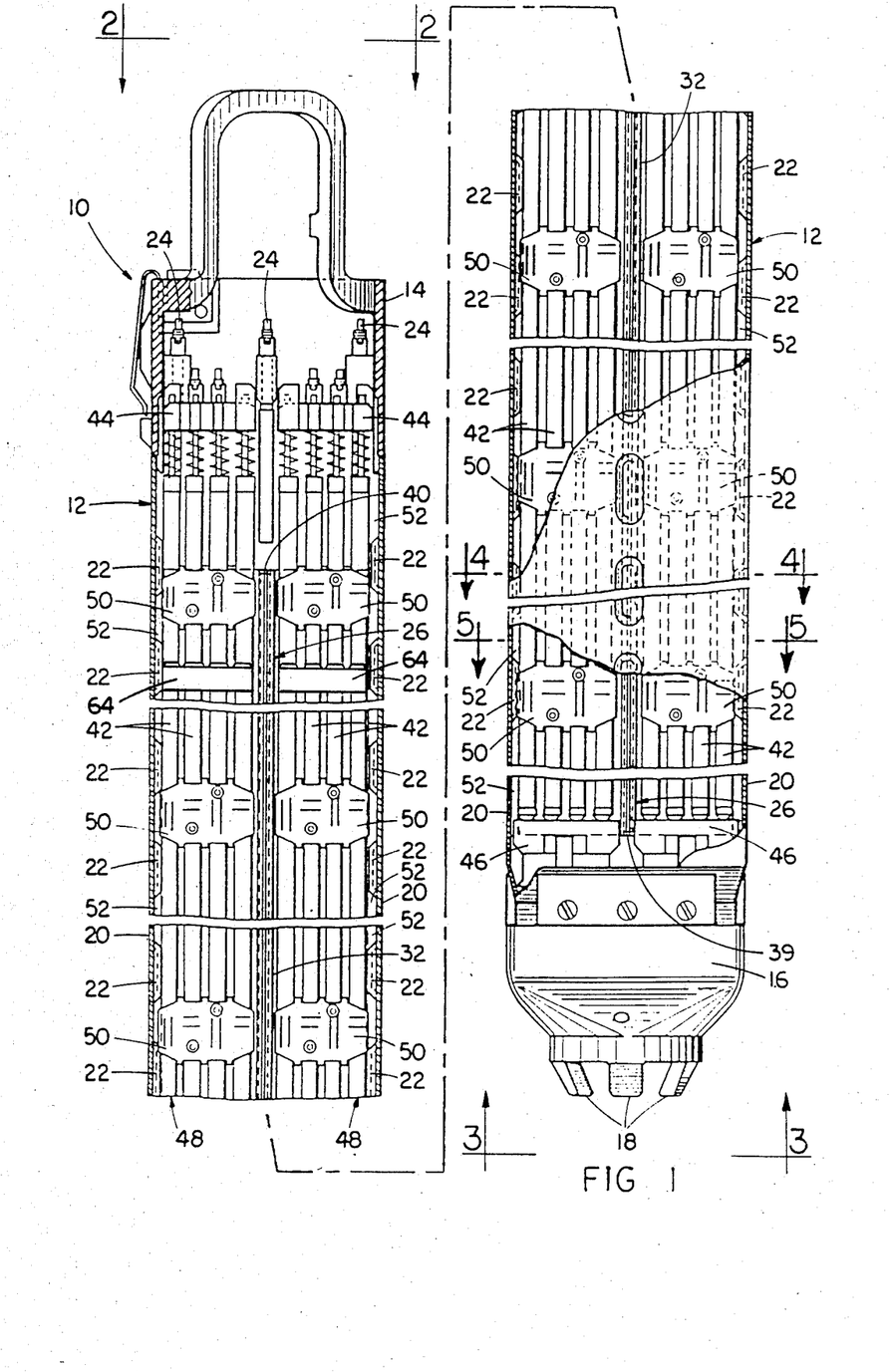
FIG. 1 is an elevational view, with parts broken away and sectioned for clarity, of a BWR nuclear fuel assembly incorporating an intermediate flow mixing nonsupport grid constructed in accordance with principles of the present invention.
Figure 2:
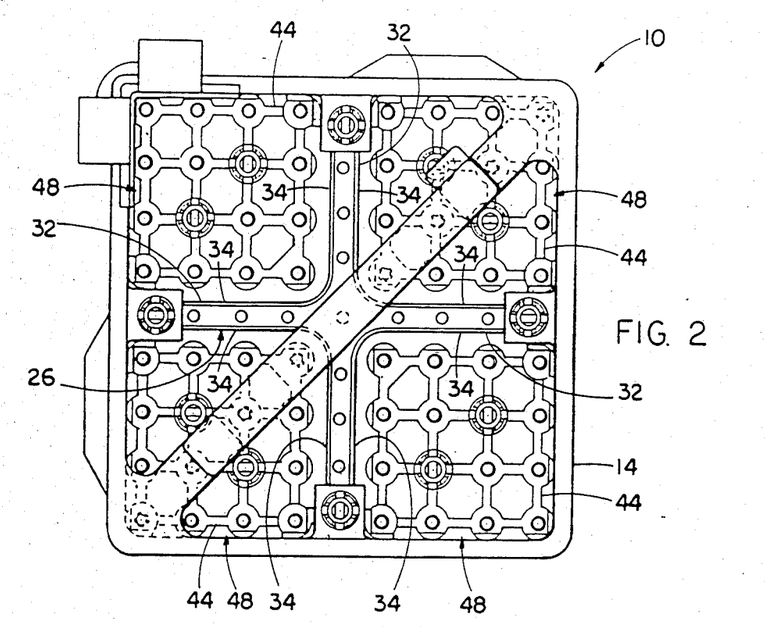
FIG. 2 is an enlarged top plan view of the BWR fuel assembly as seen along line 2—2 of FIG. 1.
Figure 3:
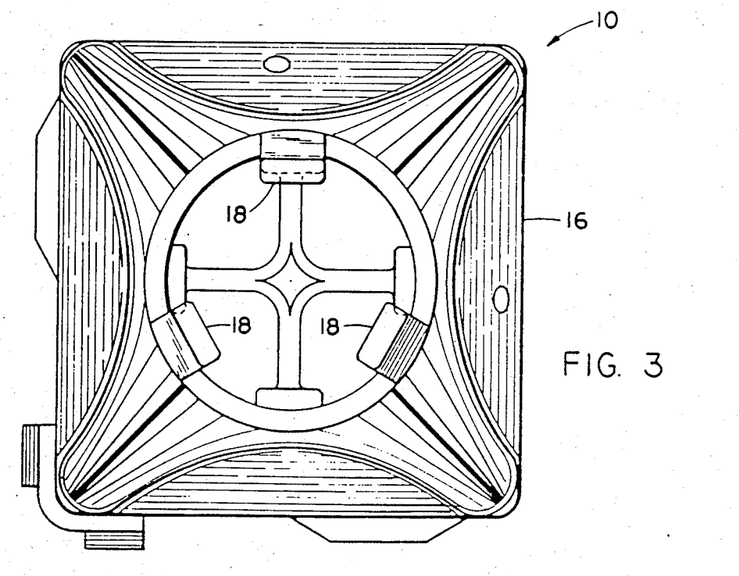
FIG. 3 is an enlarged bottom plan view of the BWR fuel assembly as seen along line 3—3 of FIG. 1.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
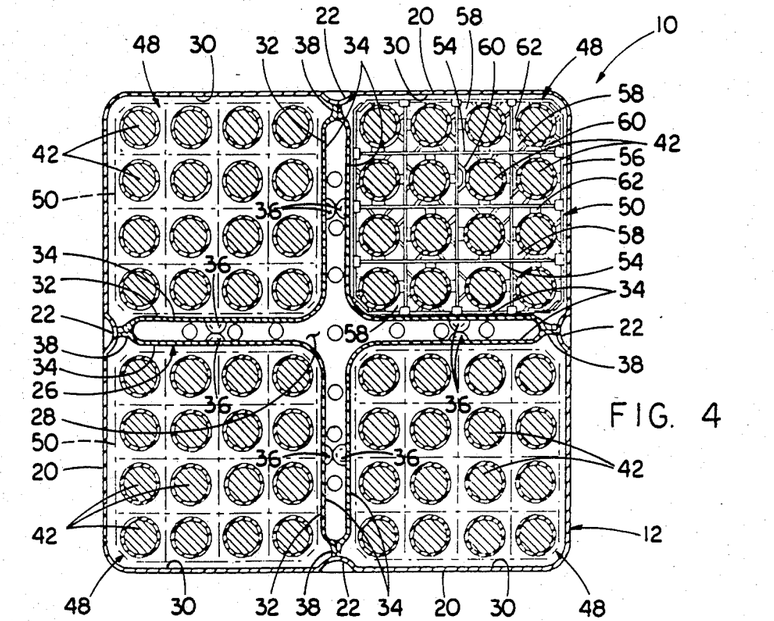
FIG. 4 is a cross-sectional view of the BWR fuel assembly taken along line 4—4 of FIG. 1, showing the fuel rod bundle of the fuel assembly being separated into separate mini-bundles by the water cross with a spacer surrounding one of the mini-bundles being shown in full, while the spacers surrounding the other three mini-bundles are shown in outline form.
Figure 5:
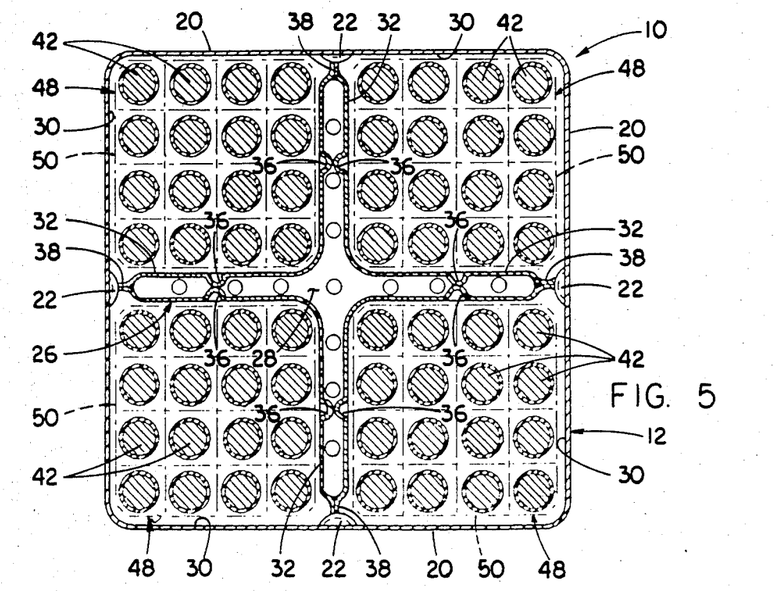
FIG. 5 is another cross-sectional view of the BWR fuel assembly similar to that of FIG. 4, but taken along line 5—5 of FIG. 1.

For improving neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongate, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 39 and an opposite upper flow outlet end 40 which each communicate with the inner channel 28 for providing subcoolant flow therethrough.

Disposed within the channel 12 is a bundle of fuel rods 42 which, in the illustrated embodiment, number sixty-four and form an 8×8 array. The fuel rod bundle is, in turn, separated into four mini-bundles thereof by the water cross 26. The fuel rods 42 of each mini-bundle, such being sixteen in number in a 4×4 array, extend in laterally spaced apart relationship between an upper tie plate 44 and a lower tie plate 46 and connected together with the tie plates comprise a separate fuel rod subassembly 48 within each of the compartments 30 of the channel 12. A plurality of support grids or spaces 50 axially spaced along the fuel rods 42 of each fuel rod subassembly 48 hold and maintain the fuel rods in their laterally spaced relationships. Coolant flow paths and cross-flow communication are provided between the fuel rod subassemblies 48 in the respective separate compartments 30 of the fuel assembly 10 by a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 48.

As seen generally in FIG. 4, each spacer 50 includes a plurality of interleaved inner members 54 and an outer member 56 interconnected together and being arranged in an egg-crate configuration to define a plurality of hollow cells 58. Dimples 60 and springs 62 are formed in the members 54,56 so as to project into the hollow cells 58. The distance between opposite dimples 60 and springs 62 is less than the diameter of the fuel rods 42 such that the fuel rods received through the hollow cell 58 are supported, i.e. held and retained, in the desired spaced apart and generally parallel extending relation to one another by the dimples and springs.

The above-described basic components of the BWR fuel assembly 10 are known in the prior art, such as in the fuel assembly disclosed in the patent to Barry et al cited above, and have been discussed in sufficient detail herein to enable one skilled in the art to understand the feature of the present invention presented hereinafter. For a more detailed description of the construction of the BWR fuel assembly, attention is directed to the above-mentioned Barry et al patent.

Intermediate Flow Mixing Grid for Improved CHF Performance

The present invention provides improved features in the axial CHF limiting locations of the fuel assembly 10. Referring to FIGS. 6–9, these features comprise at least one intermediate flow mixing nonsupport grid 64 disposed along each of subassemblies 48 between and in spaced relation from a pair of the spacers 50. Preferably, two flow mixing nonsupport grid 64 are provided, one between the sixth or uppermost spacer and the fifth or next lower spacer and the other one between the fifth and fourth spacers. The upstream sides of the sixth and fifth spacers 50 are the CHF limiting locations in the BWR fuel assembly 10.

Figure 6:
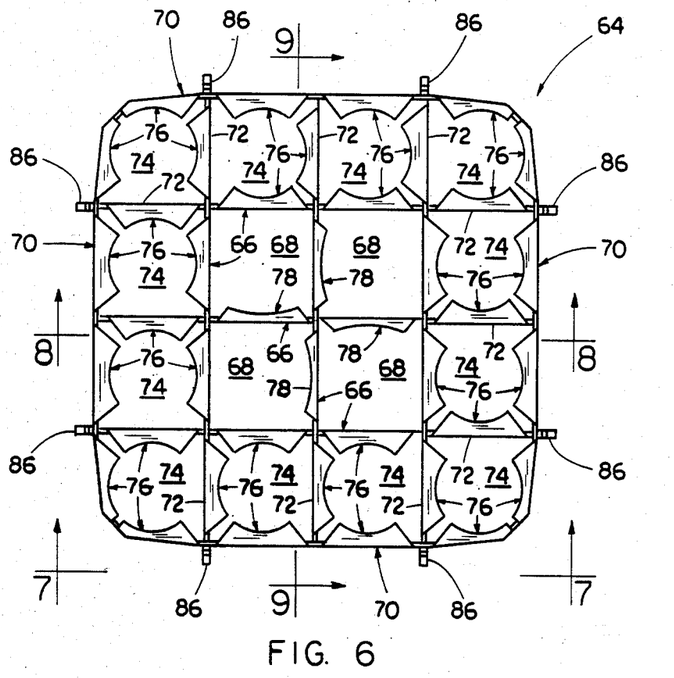
FIG. 6 is an enlarged top plan view of the intermediate flow mixing nonsupport grid removed from the fuel assembly of FIG. 1.

Basically, the intermediate flow mixing nonsupport grid 64 has a strap arrangement similar to the above-described member arrangement of the support spacer; however, there are no dimples or springs provided in conjunction to its strap arrangement with which to support, i.e. engage and hold, the fuel rods 42. So, the intermediate flow mixing nonsupport grid 64 includes a plurality of interleaved inner straps 66 arranged in an egg-crate configuration to define a plurality of inner cell openings 68. Centrally-located ones of the fuel rods 42 in each of the subassemblies 48 extend through the inner cell openings 68. The nonsupport grid 64 also includes an outer peripheral strap 70 attached to respective terminal end portions 72 of the inner straps 66 to define a plurality of perimeter cell openings 74. Peripherally-located ones of the fuel rods 42 in each of the subassemblies 48 extend through the perimeter cell openings 74 adjacent the respective channel walls 20 and water cross panels 32.

Figure 7:
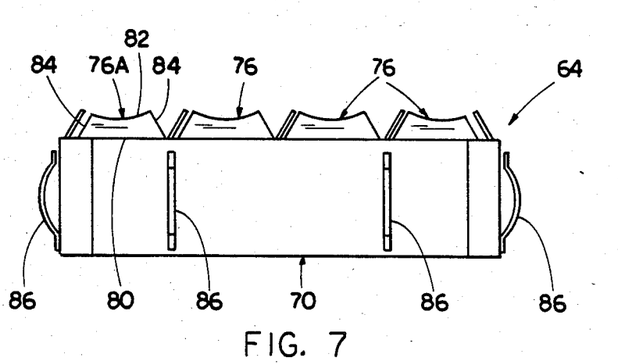
FIG. 7 is a side elevational view of the intermediate flow mixing nonsupport grid as seen along line 7—7 of FIG. 6.

The nonsupport grid 64 also includes first and second groups of mixing vanes 76,78 provided on the downstream side of the grid. No vanes are provided on the upstream side of the grid. The mixing vanes 76 of the first group, preferably being substantially identical to one another, are attached on the portions of the outer strap 70 and on the respective portions of the inner straps 66 which together with the outer strap portions define the perimeter cell openings 74. The mixing vanes 78 of the second group, preferably being substantially identical to one another, are attached on other portions of the inner straps 66 which together with the respective portions thereof, disposed in common with the spherical cell openings 74, define the inner cell openings 68. Each of the mixing vanes 76,78 of both groups extending generally in a downstream direction and are bent at its upper portion to project into the respective one of the perimeter and inner cell openings 74,68 with which it is associated for deflecting coolant flowing therethrough. The distance between opposing ones of the vanes 76,78 associated with each of the perimeter and inner cell openings 74,68 is greater than the diameter of the fuel rod 42 received through the respective cell opening; thus, the vanes do not support the fuel rods in the cell openings.

Figure 8:
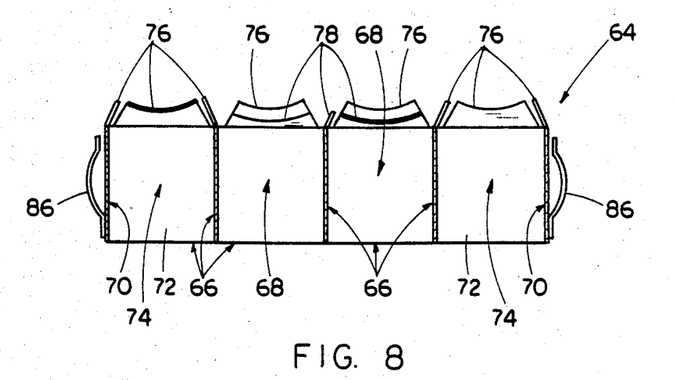
FIG. 8 is a cross-sectional view of the intermediate flow mixing nonsupport grid as seen along line 8—8 of FIG. 7.
Figure 9:
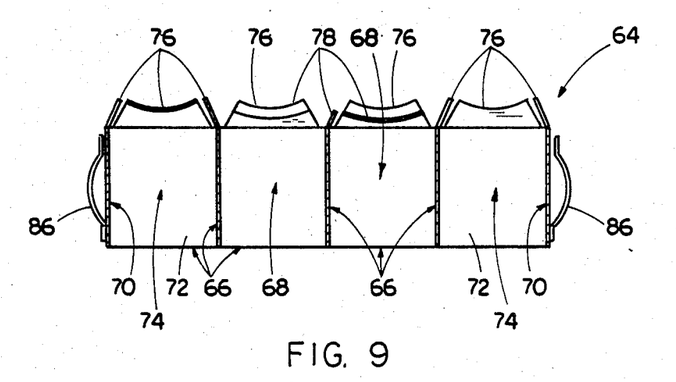
FIG. 9 is a cross-sectional view of the intermediate flow mixing nonsupport grid as seen along 9—9 of FIG. 7.

As best shown in FIGS. 8 and 9, the mixing vanes 78 of the second group are substantially smaller in size than the mixing vanes 76 of the first group so as to generate substantially less turbulence in the portions of the coolant flowing through the inner cell openings 68 than in the portions of the coolant flowing through the perimeter cell openings 74. This size relationship allows the mixing vanes 76,78 to achieve the most efficient degree of flow mixing without significantly disturbing the high void fraction central regions at the location of the inner cell openings 68.

More particularly, the mixing vanes 78 of the second group are substantially shorter in height than the mixing vanes 76 of the first group, although the lengths of the mixing vanes 76,78 of both groups are substantially identical. Further, each of the mixing vanes 76,78 of both groups is substantially greater in length than in height. In addition, each of the mixing vanes 76,78 of both groups has a strip-like form. Referring only to one vane 76A in FIG. 9 for purposes of identification, although the following description applies equally to each of the vanes 76,78 of both groups, the vane 76A has a bottom edge 80, a top edge 82 and a pair of lateral side edges 84 extending between and interconnecting the bottom and top edges 80,82. At its bottom edge 80, the vane 76A is attached to the respective one portion of the outer or inner straps 70,66 and is of a length substantially the same as that of the respective one strap portion and as that of a side of the respective one of the perimeter and inner cell openings 74,68. The lateral side edges 84 convergently taper upwardly and inwardly toward the respective one of the perimeter and inner cell openings 74,68. The top edge 82 is of a length shorter than that of the bottom edge 80 and has a concave shape. The respective lengths of the side edges 84 are substantially shorter than the lengths of either the bottom or top edges 80,82.

Each of the nonsupport grids 64 is disposed in one of the subassemblies 48 in the desired axial locations along the fuel rods 42 by a set of yieldably-resilient, arcuate-shaped elongated leaf springs 86. The leaf springs 86, comprising the invention disclosed in U.S. application Ser. No. 888,294, filed July 22, 1986 (W.E. 53,320) and assigned to the same assignee as the present invention, will exert sufficient compressive contacting force on either the walls 20 of the channel 12 or the radial panels 32 of the water cross 26 to maintain the grid 64 substantially stationary in the desired axial location. The leaf springs 86 are illustrated in FIGS. 6–9 as one example only. Other suitable arrangements can be used to mount the grids 64 within the subassemblies 48.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. An intermediate flow mixing nonsupport grid for use in a nuclear reactor fuel assembly containing an array of elongated fuel rods, said grid comprising:
   (a) a plurality of interleaved inner straps arranged in an egg-crate configuration to define a plurality of inner cell openings for receiving therethrough respective ones of said fuel rods, said inner straps having outer terminal end portions;
   (b) an outer peripheral strap attached to said respective terminal end portions of said inner straps to define a plurality of perimeter cell openings for receiving therethrough other ones of said fuel rods, said inner straps and outer strap together having opposite upstream and downstream sides;
   (c) a first group of mixing vanes disposed at said downstream side and being attached on portions of said outer strap and on respective portions of said inner straps which together with said outer strap portions define said perimeter cell openings, each of said mixing vanes of said first group extending generally in a downstream direction and inwardly toward said perimeter cell openings for deflecting coolant flowing therethrough; and
   (d) a second group of mixing vanes disposed at said downstream side and being attached on other portions of said inner straps which together with said respective portions thereof define said inner cell openings, each of said mixing vanes of said second group extending generally in a downstream direction and inwardly toward said inner cell openings for deflecting coolant flowing therethrough;
   (e) said mixing vanes of said second group being substantially smaller in size than said mixing vanes of said first group so as to generate substantially less turbulence in the portions of the coolant flowing through said inner cell openings than in the portions of the coolant flowing through said perimeter cell openings.

2. The grid as recited in claim 1, wherein said mixing vanes of said first group are substantially identical with one another.

3. The grid as recited in claim 1, wherein said mixing vanes of said second group are substantially identical with one another.

4. The grid as recited in claim 1, wherein said mixing vanes of said second group are substantially shorter in height than said mixing vanes of said first group.

5. The grid as recited in claim 4, wherein said mixing vanes of said second group are substantially identical in length to said mixing vanes of said first group.

6. The grid as recited in claim 1, wherein each of said mixing vanes of said first and second groups is substantially greater in length than in height.

7. The grid as recited in claim 1, wherein each of said mixing vanes of said first and second groups has a strip-like form and a bottom edge at which it is attached to a respective one of said outer and inner strap portions being of a length substantially the same as that of said respective one strap portion, a pair of lateral side edges which convergently taper upwardly and inwardly toward the respective one of said perimeter and inner cell openings and a top edge of a length shorter than that of said bottom edge and having a concave shape, the respective lengths of said side edges being substantially shorter than the lengths of either of said bottom or top edges.

8. The grid as recited in claim 1, wherein the distance between opposing vanes associated with each of said perimeter and inner cell openings is greater than the diameter of the fuel rod receivable through said cell opening.

9. In a fuel assembly having an array of spaced fuel rods, an outer hollow tubular flow channel surrounding said fuel rods so as to direct flow of coolant fluid therealong and a water cross extending through said channel and having a plurality of radially extending members dividing said array of fuel rods into a plurality of separate fuel rod mini-bundle subassemblies, each subassembly having a plurality of spacers being displaced from one another along the length of said subassembly between the bottom and top thereof and surrounding said fuel rods thereof so as to maintain them in side-by-side spaced relationship, at least one intermediate flow mixing nonsupport grid disposed along each of said subassemblies between and in spaced relation from a pair of said spacers, said grid comprising:

(a) a plurality of interleaved inner straps arranged in an egg-crate configuration to define a plurality of inner cell openings which receive therethrough respective ones of said fuel rods in said respective one of said subassemblies thereof, said inner straps having outer terminal end portions;

(b) an outer peripheral strap attached to said respective terminal end portions of said inner straps to define a plurality of perimeter cell openings which receive therethrough other ones of said fuel rods in said respective one of said subassemblies thereof, said inner straps and outer strap together having opposite upstream and downstream sides;

(c) a first group of mixing vanes disposed at said downstream side and being attached on portions of said outer strap and on respective portions of said inner straps which together with said outer strap portion define said perimeter cell openings, each of said mixing vanes of said first group extending generally in a downstream direction and inwardly toward said perimeter cell openings for deflecting coolant flowing therethrough; and (d) a second group of mixing vanes disposed at said downstream side and being attached on other portions of said inner straps which together with said respective portions thereof define said inner cell openings, each of said mixing vanes of said second group extending generally in a downstream direction and inwardly toward said inner cell openings for deflecting coolant flowing therethrough;

(e) said mixing vanes of said second group being substantially smaller in size than said mixing vanes of said first group so as to generate substantially less turbulence in the portions of the coolant flowing through said inner cell openings than in the portions of the coolant flowing through said perimeter cell openings.

10. The grid as recited in claim 9, wherein said mixing vanes of said first group are substantially identical with one another.

11. The grid as recited in claim 9, wherein said mixing vanes of said second group are substantially identical with one another.

12. The grid as recited in claim 9, wherein said mixing vanes of said second group are substantially shorter in height than said mixing vanes of said first group.

13. The grid as recited in claim 12, wherein said mixing vanes of said second group are substantially identical in length to said mixing vanes of said first group.

14. The grid as recited in claim 9, wherein each of said mixing vanes of said first and second groups is subtantially greater in length than in height.

15. The grid as recited in claim 9, wherein each of said mixing vanes of said first and second groups has a strip-like form and a bottom edge at which it is attached to a respective one of said outer and inner strap portions being of a length substantially the same as that of said respective one strap portion, a pair of lateral side edges which convergently taper upwardly and inwardly toward the respective one of said perimeter and inner cell openings and a top edge of a length shorter than that of said bottom edge and having a concave shape, the respective lengths of said side edges being substantially shorter than the lengths of either of said bottom or top edges.

16. The grid as recited in claim 9, wherein the distance between opposing vanes associated with each of said perimeter and inner cell openings is greater than the diameter of the fuel rod received through said cell opening.

* * * * *